United States Patent

Higashihara et al.

[11] Patent Number: 6,160,581
[45] Date of Patent: *Dec. 12, 2000

[54] CAMERA HAVING ADAPTIVE OBJECT IMAGE DISPLAY FACILITY

[75] Inventors: Masaki Higashihara; Noriyoshi Chizawa, both of Kanagawa-ken, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/921,881

[22] Filed: Sep. 2, 1997

Related U.S. Application Data

[63] Continuation of application No. 08/363,712, Dec. 23, 1994, abandoned.

[30] Foreign Application Priority Data

Dec. 28, 1993 [JP] Japan ................................. 5-337136

[51] Int. Cl.[7] ........................... H04N 3/14; H04N 5/238; H04N 9/73
[52] U.S. Cl. .......................... 348/364; 348/64; 348/223; 348/254; 348/273; 348/333; 396/271; 396/275
[58] Field of Search ................................. 348/207, 222, 348/223, 224, 225, 228, 254, 255, 333, 334, 335, 340, 362, 363, 364, 71, 97, 229, 230, 266, 272, 273, 270; 396/268, 271, 272, 273, 275; H04N 5/235, 5/238

[56] References Cited

U.S. PATENT DOCUMENTS

| | | | |
|---|---|---|---|
| 4,468,693 | 8/1984 | Fujita et al. | 358/78 |
| 4,742,369 | 5/1988 | Ishii et al. | 354/441 |
| 4,831,437 | 5/1989 | Nishioka et al. | 348/71 |
| 5,161,025 | 11/1992 | Nakao . | |
| 5,194,943 | 3/1993 | Tomita et al. | 358/32 |
| 5,321,500 | 6/1994 | Capitant et al. | 348/97 |
| 5,381,208 | 1/1995 | Takagi | 384/415 |
| 5,515,104 | 5/1996 | Okada | 348/334 |
| 5,557,358 | 9/1996 | Mukai et al. | 348/333 |
| 5,710,954 | 1/1998 | Inoue | 396/374 |

*Primary Examiner*—Wendy Garber
*Assistant Examiner*—Ngoc-Yen Vu
*Attorney, Agent, or Firm*—Robin, Blecker & Daley

[57] ABSTRACT

A camera includes an exposure part arranged to cause a film loaded on the camera to be exposed to light, an image sensor arranged to convert an object image into an electrical signal, a signal processing circuit arranged to carry out predetermined processes on the signal outputted from the image sensor, the signal processing circuit being arranged to perform the processes for obtaining an object image which is nearly equivalent to an image of a picture to be obtained when a specific film is exposed to light under set exposure conditions, and a display device arranged to display the object image by using the signal processed by the signal processing circuit.

5 Claims, 10 Drawing Sheets

CAMERA HAVING ADAPTIVE OBJECT IMAGE DISPLAY FACILITY

This is a continuation application under 37 CFR 1.62 of prior application Ser. No. 08/363,712, filed Dec. 23, 1994, abandoned.

BACKGROUND OF THE INVENTION

1. Field of the Invention

This invention relates to a camera having a viewfinder device.

2. Description of the Related Art

In the field of silver-halide type cameras, there has been proposed a viewfinder device which is arranged to guide a light flux passing through a photo taking lens to an image sensor and to have an object image displayed on a display device by using a signal outputted from the image sensor. Japanese Laid-Open Patent Application No. HEI 1-133037 also discloses a viewfinder system for a camera, which is arranged as shown in FIG. 10. Referring to FIG. 10, a light flux passing through a photo taking lens 101 forms an object image on a image sensor 109 through a reflection mirror 108. The object image is photo-electric converted into an electrical signal by the image sensor 109.

The electrical signal is stored in a memory device 121 through a camera control unit 120. The stored electrical signal is arranged to be supplied either to a monitor 122 or a printer 123, so that the state of an object image obtained at the time of or immediately before the time of an exposure of a silver-halide film can be confirmed. The viewfinder device arranged in this manner enables the camera operator to know at once whether a shot taken is a success or a failure and how it looks.

However, the examples of the prior art cited above have not been arranged to process signals paying any heed to the photosensitivity characteristic of the film, the luminosity or density characteristic of the display device 122 or the printer 123.

This negligence tends to result in a difference between a video image obtained on the monitor 122 or the printer 123 and a picture actually obtained by developing the film. Hence it has been probable that the monitoring confirmation leads to a misjudgment in taking a shot.

Further, it has been impossible to prevent an unacceptable shot from being taken, because the success or the failure of the shot cannot be found before completion of photographing. Such uncertainty has prompted photographers to use further amounts of film than actually necessary when they wish to take good pictures.

SUMMARY OF THE INVENTION

It is one aspect of this invention to provide a camera which is of the kind having an image sensor arranged to convert an object image into an electrical signal and is capable of preventing any unacceptable picture from being taken by processing the signal of the image sensor for a display of an image in such a manner that the image can be displayed in a state nearly equivalent to a picture to be taken by exposing a film.

The above and other aspects and features of this invention will become apparent from the following detailed description of embodiments thereof taken in connection with the accompanying drawings.

DETAILED DESCRIPTION OF PREFERRED EMBODIMENTS

A viewfinder device of a camera arranged as an embodiment of this invention is described below by way of example with reference to the accompanying drawings.

Figure 1:
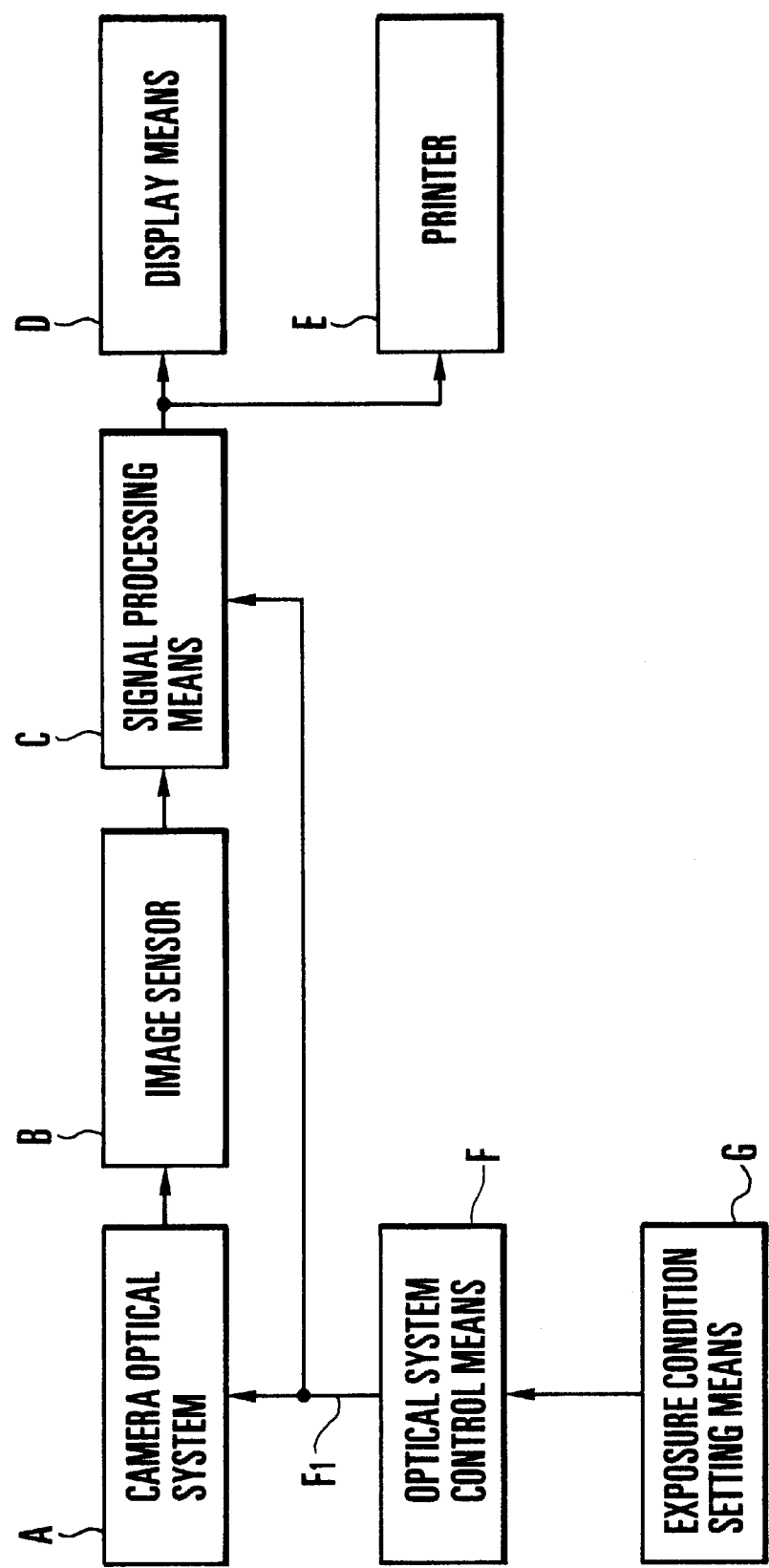
FIG. 1 is a block diagram showing the arrangement of a viewfinder device of a camera which is arranged as an embodiment of this invention.

FIG. 1 shows in a block diagram the fundamental functional arrangement of the viewfinder device of the camera of this invention. As shown, the viewfinder device of the camera consists of a camera optical system A, an image sensor B, signal processing means C, display means D, a printer E, optical system control means F and exposure condition setting means G.

The optical system control means F is provided for controlling the camera optical system A according to exposure conditions inputted from the exposure condition setting means G, including information on an aperture value, a shutter speed, the sensitivity of film, etc. In the case of this embodiment, an exposure control signal F1 is not only outputted from the optical system control means F for exposure control over the optical system but also is supplied to the signal processing means C.

Figure 2:
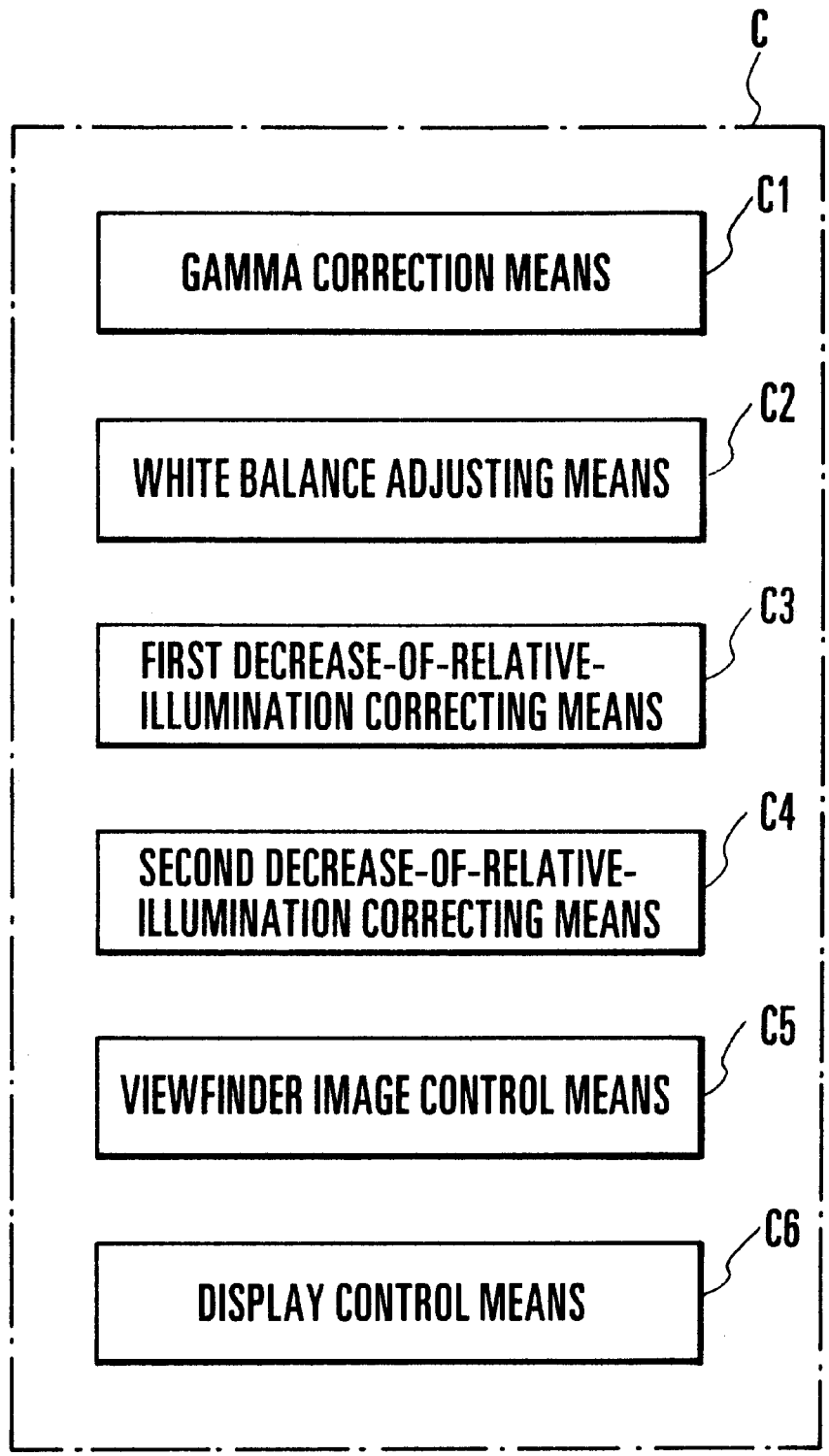
FIG. 2 shows the main functions arranged to be carried out by signal processing means.

As shown in FIG. 2 which is a functional chart, the signal processing means C is provided with means for varied kinds for processing a video signal coming from the image sensor B. In this case, the signal processing means C includes gamma correction means C1, white balance adjusting means C2, first decrease-of-relative-illumination correcting means C3, second decrease-of relative-illumination correcting means C4, viewfinder image control means C5, display control means C6, etc. Among these means, the first decrease-of-relative-illumination correcting means C3 is provided for correcting a drop in a peripheral light quantity caused by the pupil of the photo taking lens and the viewfinder optical system. The second decrease-of-relative-illumination correcting means C4 is provided for correcting a drop in light quantity caused by the absence of a quick return mirror by computing information on the drop of light quantity due to the absence of the mirror from information on the pupil of the photo taking lens and information on the position of the quick return mirror.

Figure 3:
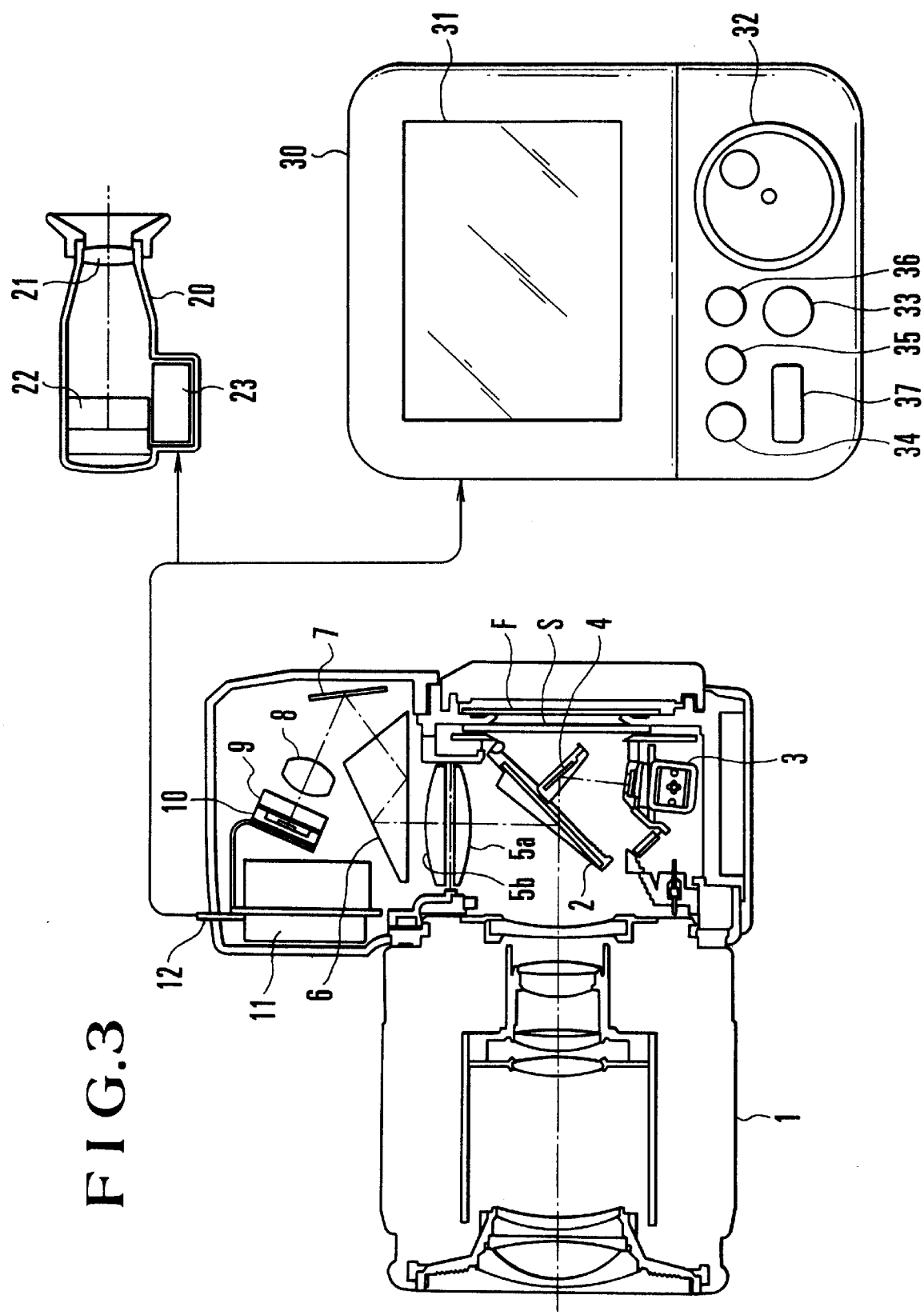
FIG. 3 shows the arrangement of the camera having an electronic viewfinder and that of a viewfinder image display device of the embodiment of this invention.

FIG. 3 shows by way of example an optical layout of the viewfinder device as in a state of being applied to a single-lens reflex camera. The camera is shown as in a condition of allowing the operator to view an object to be photographed before taking a shot. Under this condition, a light flux passing through a photo taking lens 1 is divided by a half-mirror 2 into a light flux which proceeds to a viewfinder system and another light flux which proceeds to a focus detecting device 3.

The light flux proceeding to the viewfinder system comes to condenser lenses 5a and 5b, a prism 6 and a mirror 7 to be guided through a reimaging lens 8 and a filter 9 to the light receiving part of a sensor 10 which is employed as the image sensor B.

The condenser lenses 5a and 5b are provided for the purpose of increasing the quantity of light coming to the sensor 10 and particularly for preventing the peripheral part of the sensor 10 from becoming shadowy. For this purpose, the power of the condenser lenses 5a and 5b is determined according to the aperture position of the reimaging lens 8 and the pupil position of the photo taking lens 1. In the event of the camera using an interchangeable lens, the condenser lenses 5a and 5b must be arranged to have a variable power. For example, it is preferable to arrange either one of or both of the condensor lenses 5a and 5b to be replaced according to the use of a wide-angle type photo taking lens or a telephoto type photo taking lens.

The prism 6 and the mirror 7 are arranged to efficiently use an available space and also to reflect light an odd-number of times in such a way as to bring a reflected image into the original image. In case where the signals of the sensor 10 can be read out in a manner reverse to the reading direction of an ordinary image sensor or where the signals can be processed in such a way as to reversely rearrange them, it is not necessary to impose any limitation on the number of reflecting times.

The reimaging lens 8 is arranged to form an aerial image of a plane equivalent to the primary imaging plane of the photo taking lens 1 (i.e. a film surface) on the light receiving surface of the sensor 10. The filter 9 is arranged not only to remove infrared rays but also to serve as an optical low-pass filter. The filter 9 is provided for the purpose of preventing any infrared rays from falling on the sensor 10 which is responsive to infrared rays as well as for ensuring uniform incidence of light from one and the same object on one set of light receiving parts having two-dimensionally arranged R, G and B filters for obtaining a color image. Therefore, in case where an infrared film is to be used, the filter 9 must be arranged to have a visual light removing function instead of the infrared ray removing function. Then it is not necessary to arrange it to serve as the optical low-pass filter and to arrange the sensor 10 to have the R, G and B filters.

The image formed on the light receiving part of the sensor 10 is converted into an electrical signal by the sensor 10. The electrical signal is supplied to a processing circuit 11. At the processing circuit 11, the signal is processed according to the characteristics of the sensor 10 and the photo taking lens 1, the sensitivity characteristic of the film, exposure information and the luminosity characteristic of each display device. The signal is processed in such a way as to have a video image displayed at each display device in close proximity to an image to be actually photographed on the film. The signal thus processed is supplied either to a viewfinder unit 20 or to a remote control unit 30 which is employed as a display device. The viewfinder unit 20 or the remote control unit 30 is arranged to display an object image on the basis of the video signal outputted from the camera. In FIG. 3, a reference symbol S denotes a shutter and another symbol F a silver-halide film.

Figure 4:
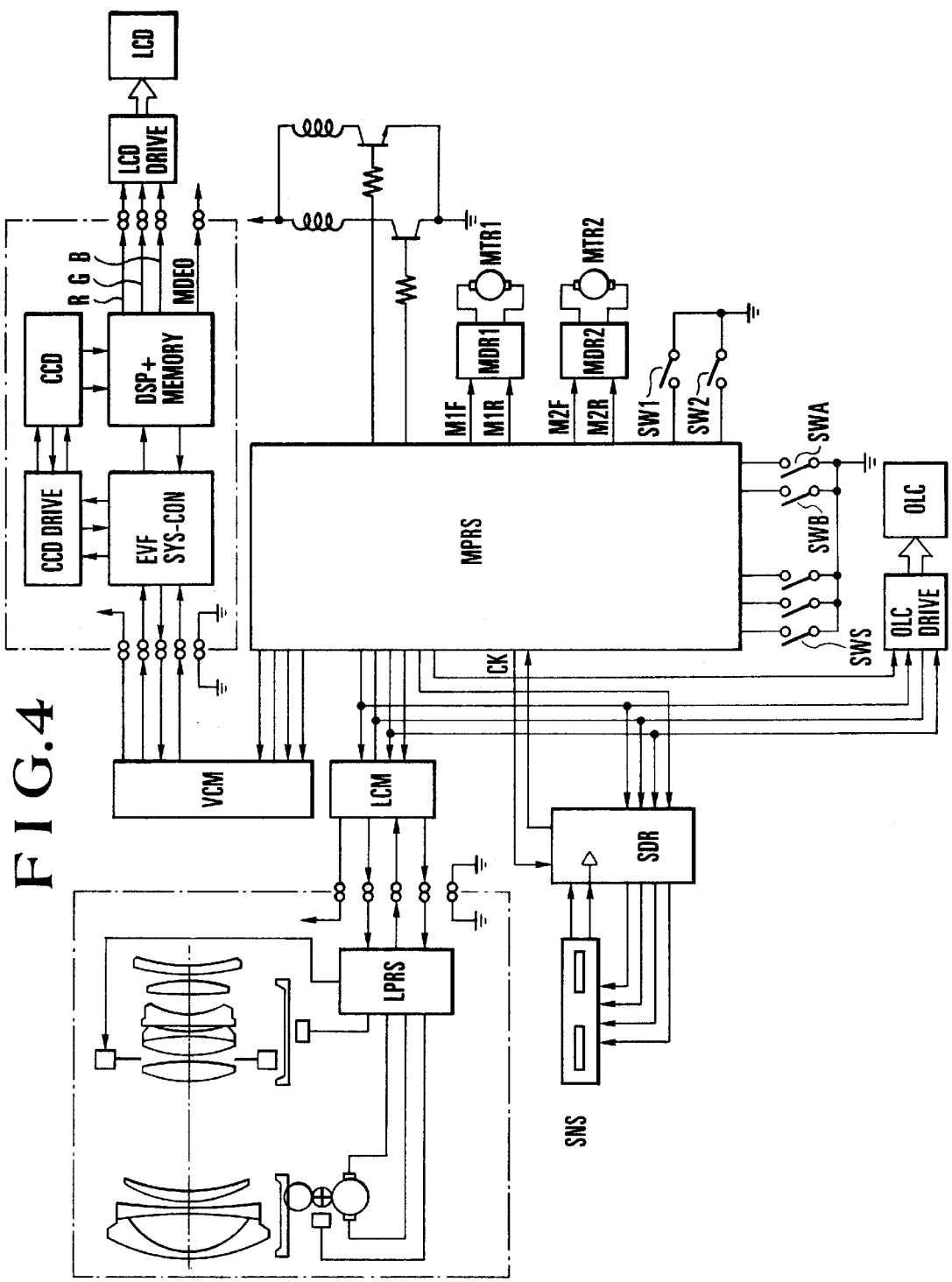
FIG. 4 is an electric circuit diagram showing in outline the flow of signals of a whole camera system related to the embodiment of this invention.
Figure 5:
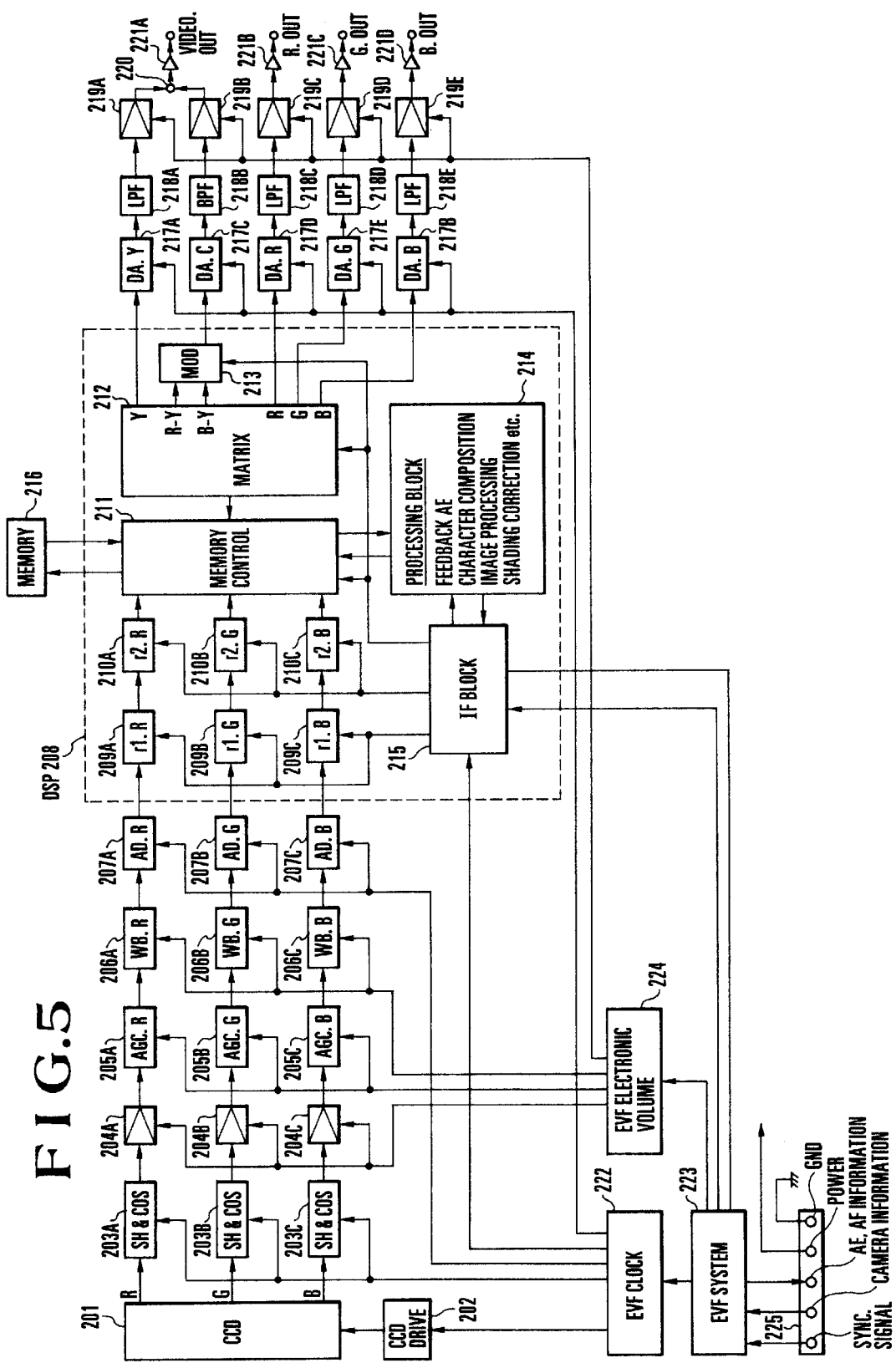
FIG. 5 is an electric circuit diagram of the electronic viewfinder related to this invention.

FIGS. 4 and 5 show the further details of the embodiment of this invention. FIG. 4 is a circuit diagram showing the electric circuit arrangement of the whole camera system including an interchangeable lens. FIG. 5 is a circuit diagram showing the details of the viewfinder system of the embodiment.

Referring to FIG. 4, a camera control device MPRS (hereinafter referred to as a microcomputer or simply as a computer) is a one-chip microcomputer including the functions of a CPU (central processing unit), a ROM, a RAM and an A/D converter. The computer MPRS is arranged to carry out a sequence of processes of the camera including an automatic exposure control function, an automatic focus detecting function, film winding, etc. For this purpose, the computer MPRS communicates with a peripheral circuits disposed within the camera body, the lens and a viewfinder circuit by using synchronous communication signals and communication selecting signals for controlling the actions of various circuits and the lens.

A buffer LCM is provided for communication between the camera and the lens. A buffer VCM is provided for communication between the camera and the electronic viewfinder device. A lens controlling microcomputer LPRS, an electronic viewfinder device controlling microcomputer EVF SYS-CON are arranged to communicate with the computer MPRS through these buffers LCM and VCM.

A driving circuit SDR is arranged to drive a line sensor device SNS for detecting focus under the control of the microcomputer MPRS. A switch detecting and display circuit OLC-DRIVE is arranged to change a display made by a display member OLC showing the state of control of the camera from one display over to another on the basis of data received from the microcomputer MPRS.

The microcomputer EVF SYS-CON (hereinafter referred to as EVF system controller) is arranged to control the electronic viewfinder device EVF and to communicate with the microcomputer MPRS of the camera to provide the latter with information on the luminance of the object to be photographed and to receive from the latter various data, such as data of an exposure, the film and the lens through the communication and to control a signal processing operation on the signals coming from an image sensor CCD on the basis of the data.

A driving circuit CCD-DRIVE is arranged to drive the image sensor CCD according to an instruction of the EVF system controller. A digital signal processor DSP is arranged to process the signal outputted from the image sensor CCD. Data necessary for the processes to be carried out by the digital signal processor DSP is stored in a memory MEMORY. The signal thus processed is outputted in the form of R, G and B signals or a video signal. The signal processed is supplied to a driving circuit LCD-DRIVE which is arranged to drive a display element LCD. The display element LCD then displays an image of the object.

FIG. 5 shows the electric circuit block diagram of the viewfinder system. The display element and the driving circuits for driving the display element are omitted from this illustration. In FIG. 5, a reference numeral 201 denotes a CCD which is the image sensor. A CCD driver 201 is arranged to drive the CCD 201. Sample-and-hold circuits (hereinafter referred to as SH circuits) 203A, 203B and 203C are arranged to take out R, G and B signal components from the signal outputted from the CCD 201. Adjustment amplifiers 204A, 204B and 204C are arranged to adjust any intrinsic error of the CCD 201. The illustration includes automatic gain control type amplifiers 205A to 205C (hereinafter referred to as AGC amplifiers), white balance amplifiers 206A to 206C (hereinafter referred to as WB amplifiers), AD converters 207A to 207C which are arranged to convert the outputs of the WB amplifiers 206A to 206C into digital data, and a digital signal processer 208 (hereinafter referred to as DSP) which is arranged to process the digital data outputted from the AD converter.

First gamma circuits 209A to 209C are arranged to make gamma correction relative to the sensitivity characteristic of the film. Second gamma circuits 210A to 210C are arranged to make gamma correction relative to the luminosity characteristic of the display element. A memory controller 211 is arranged to communicate for data with a memory 216 which will be described later. A matrix circuit 212 is provided for forming data necessary as outputs from data obtained through the memory controller 211. A modulation circuit 213 is arranged to form modulated chrominance signal data C from color-difference signals R-Y and B-Y obtained from the matrix circuit 212. An arithmetic process block 214 is arranged to carry out computing operations within the DSP 208 for character combining, video image computation, shading correction, feedback AE (automatic exposure control) and AF (automatic focusing). A block DSP-IF 215 is arranged to conduct data communication or pulse communication with the DSP 208, with an EVF clock 222 which will be described later and with the EVF system controller 223.

A reference numeral 216 denotes a memory. D/A converters 217A to 217E are arranged to convert the digital data outputted from the DSP 208 into analog signals. Filters 218A to 218E are arranged to limit the frequency band of the analog signals outputted from the D/A converters 217A to 217E. Output level adjustment amplifiers 219A to 219E are provided for setting the level of the signals to be outputted. A numeral 220 denotes adders. Numerals 221A to 221D denote output buffers.

The EVF (electronic viewfinder) clock 222 is arranged to control the timing of the whole system. The EVF system controller 223 is arranged to control the whole system. An electronic volume 224 is arranged to adaptively control the adjustment amplifiers 204, the AGC amplifiers 205, the WB amplifiers 206 and the output level adjustment amplifiers 219 under the control of the EVF system controller 223. A connector 225 is arranged for communication with the microcomputer MPRS which is disposed on the side of the camera.

The operation of the embodiment arranged in the above-stated manner is described as follows.

The EVF system controller 223 controls the EVF clock 222, the electronic volume 224 and the DSP 208 on the basis of data sent via the connector 225 from the microcomputer MPRS disposed on the side of the camera.

Under the control of the controller 223, the CCD 201 is first caused to perform charge storing and reading operations by the EVF clock 222 and the CCD driver 202. A signal outputted from the CCD 201 is supplied to the SH circuits 203. The R, G and B signal components are taken out by the SH circuits 203. The R, G and B signal components are supplied to the adjustment amplifiers 204 to correct any intrinsic error fluctuation. The corrected signals are processed on the basis of the data of the microcomputer MPRS by the AGC amplifiers 205 and the WB amplifiers 206 which are controlled by the electronic volume 224. The signals thus processed are supplied to the DSP 208.

Processes to be performed within the DSP 208 are described as follows. Within the DSP 208, the first gamma circuit 209 makes gamma correction for the sensitivity characteristic of the film while the second gamma circuit 210 makes gamma correction for the luminosity characteristic of the display element. The memory 216 which is controlled by the memory controller 211 and the arithmetic process block 214 are next operated to perform various computing processes for combining characters, video image addition, shading correction, feedback control over the AE and AF operations.

The character combining process is performed for displaying a date and characters to be imprinted, a focus detecting area, and photographing information such as a shutter speed, an aperture value, an exposure correction value, an in-focus state, a defocused state, etc.

The video image adding process is performed in making a multiple exposure for confirming beforehand a video image to be added. The shading correction is performed for correcting a drop in light quantity of the peripheral part of the image plane caused by the main mirror of the camera and also the fluctuations of the intrinsic error of the CCD 201.

Data obtained through various computing and correcting processes is sent to the matrix 212 through the memory controller 211 to be converted into data necessary for outputs. In the case of this embodiment, the data includes luminance signal data Y, color-difference signal data R-Y and B-Y and primary color signal data R, G and B. Of these data, the color-difference signal data R-Y and BY are further converted by the modulation circuit 213 into a modulated chrominance signal data C.

The first and second gamma circuits 209 and 210, the memory controller 211, the arithmetic process block 214, the matrix 212 and the modulation circuit 213 are controlled by the EVF system controller 223 and the EVF clock 222 through the DSP-IF block 215. The control is performed on the basis of data from the microcomputer MPRS of the camera obtained through the connector 225.

Through these operations, the DSP 208 outputs data for a luminance signal Y, a modulated chrominance signal C and the primary color signals R, G and B. The data of varied kinds from the DSP 208 is converted by the D/A converters 217 into analog signals. The frequency bands of the analog signals are limited by the filters 218 and are then supplied to the output level adjustment amplifiers 219 which are controlled by the electronic volume 224.

The levels of the luminance signal Y and the modulated chrominance signal C are adjusted by the output level adjustment amplifiers 219A and 219B. They are then outputted as a video signal through the buffer 221A. The levels of the primary color signals R, G and B are adjusted by the output level adjustment amplifiers 219C, 219D and 219E and then they are outputted through the buffers 221B, 221C and 221D as R, G and B signals.

Figure 6:
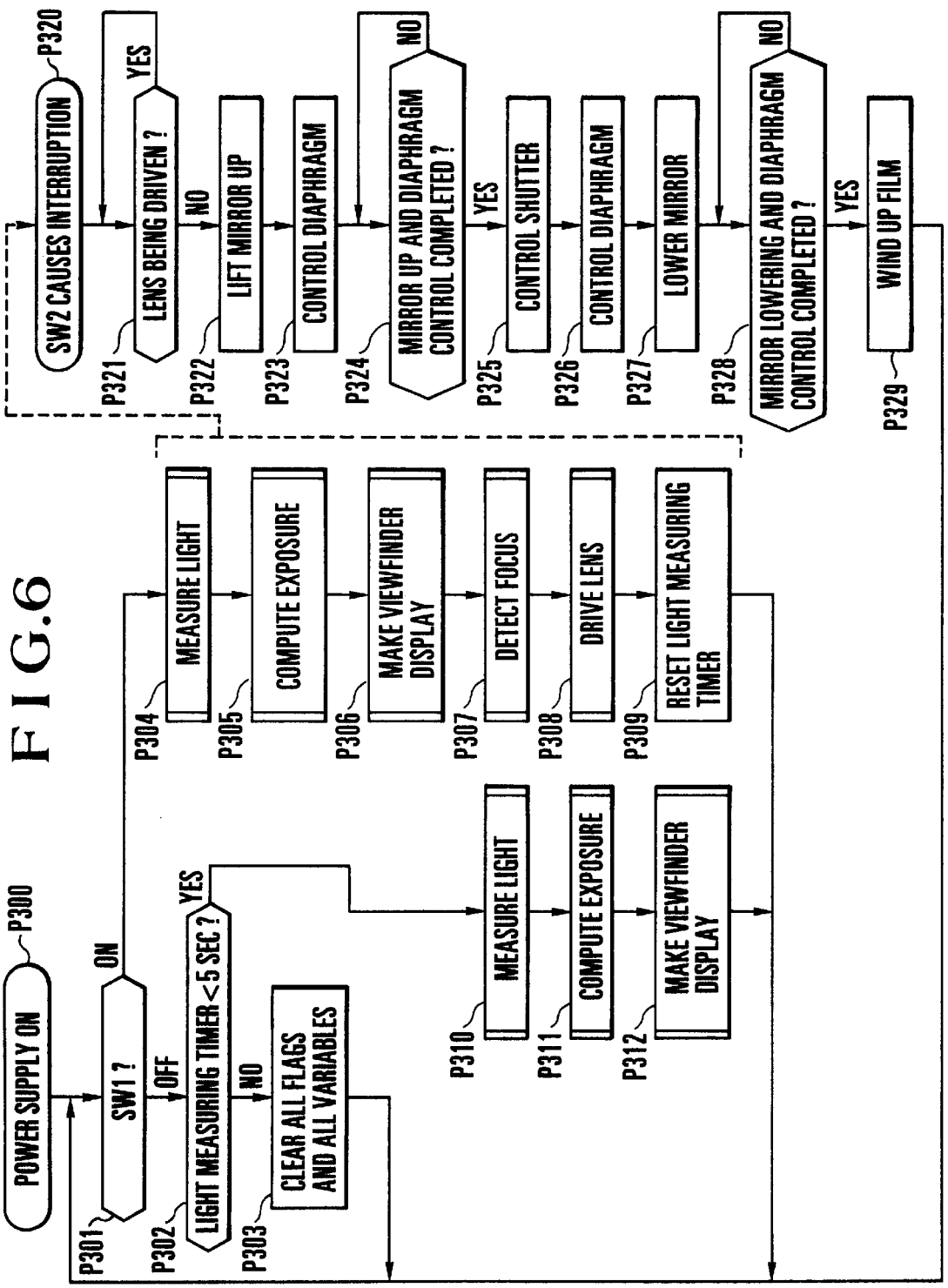
FIG. 6 is a flow chart of a main routine showing the operation of the whole camera of the embodiment.

FIG. 6 is a flow chart showing the flow of the whole control program of the camera. Referring to FIG. 6, when a power supply switch which is not shown is turned on, the power begins to be supplied to the computer MPRS. The computer MPRS then begins to execute a sequential program stored in the ROM. With the execution of the program started at a step P300, the flow of operation comes to a step P301. At the step P301, a check is made for the state of a switch SW1 which is arranged to turn on when a release button is pushed to the extent of a first stroke. If the switch SW1 is found to be in an off-state, the flow proceeds to a step P302. At the step P302, a check is made for the operating state of a light measuring timer. If the light measuring timer is found in operation and if its count value is found to be less than a predetermined value (5 sec in this instance), the flow comes to a step P310. If not, the flow comes to a step P303.

At the step P303, all flags and variables for control are cleared and initialized. These steps P301, 302 and 303 are repeated until either the switch SW1 turns on or the power supply switch is turned off.

When the switch SW1 turns on, the flow comes to a step P304. At the step P304, a light measuring operation is performed to measure the luminance of an object of shooting by using the image sensor (the CCD 201 of FIG. 5). After completion of the light measuring operation, the flow comes to a step P305 to compute an exposure (defined by a shutter speed and an aperture value) for the film on the basis of the film sensitivity and the result of the light measuring operation.

After the step P305, the flow comes to a step P306. At the step P306, an object image is supplied to the display device for the viewfinder. Steps P307 and 308 are provided for a focus adjusting operation. At the step P307, focus is detected. At the step P308, a lens driving operation is performed on the basis of the result of focus detection obtained by the step P307. At a next step P309, the light measuring timer is reset to bring the count value of the timer back to zero. The flow then comes back to the step P301. When the switch SW1 turns off from its on-state, the flow proceeds to a step P310. At steps P310, P311 and P312, only the light measuring, exposure computing and viewfinder displaying operations are carried out in the same manner as described above. Upon completion of these operations, the flow comes back to the step P301. The steps P310, P311 and P312 are repeated for a predetermined period of time (5 sec in this instance) without resetting the light measuring timer.

The viewfinder function is activated when the switch SW1 turns on as mentioned above for the purpose of saving electric energy from being wasted, because a large amount of electric energy will be consumed for operating the image sensor, the microcomputers of varied kinds and the electric circuits. Further, the reason for having the viewfinder function in an operating state over a predetermined period of time after the switch SW1 turns off is as follows. With the switch SW1 kept in its on-state, if the force of a finger with which the release button (not shown) becomes weaker or if the switch SW1 happens to be turned off in operating another operation member, the inappropriate operation might reset a setting value, make the viewfinder display disappear or bring about some other adverse effect. Therefore, in case where a large stable power supply is used, either the counting time of the light measuring timer may be increased or the viewfinder function may be kept in an operating state after the power supply switch is turned on.

When the release button is pushed further from the position where the switch SW1 has been turned on, the other switch SW2 is turned on by the release button. With the switch SW2 turned on, a function of interruption is performed to bring the flow of control immediately from any step to a step P320. At the step P320, a release operation starts.

At a step P321, a check is made to find if a lens driving operation is in process. If not, the flow comes to a step P322. If so, the flow waits until the lens comes to a stop before coming to the step P322. At the step P322, the quick return mirror is lifted up by supplying the motor control signals M2F and M2R to the mirror control circuit MDR2 for controlling the motor MTR2. At a step P323, a diaphragm is controlled by sending an aperture control value computed by the step P305 through the buffer circuit LCM to the control circuit LPRS disposed within the lens. The diaphragm aperture is controlled accordingly. At a step P324, a check is made to find if the mirror lifting and diaphragm control actions have been completed by the steps P322 and P323. The mirror lifting state can be found through a detecting switch provided for the mirror. The diaphragm control can be confirmed through communication with the lens by finding whether the diaphragm has been driven to a position corresponding to the predetermined value.

If either one of the operations of the steps P322 and P323 is found to be not completed, the flow waits for completion of the unfinished operation. Upon confirmation of completion of both of these operations, the flow comes to a step P325. At the step P325, the film is exposed to light by controlling the shutter according to a shutter speed computed at the step P305. Upon completion of the shutter control, the flow comes to a step P326. At the step P326, an instruction for the lens is sent through the communication with the lens to fully open the aperture of the diaphragm. At a step P327, the mirror is moved down. The mirror moving-down operation is carried out by controlling the motor MTR2 with the motor control signals M2F and M2R in the same manner as in the case of the mirror lifting-up operation.

At a next step P328, the flow waits for completion of the mirror moving-down operation and the aperture-opening operation in the same manner as at the step P321. Upon completion of these operations, the flow comes to a step P329. At the step P329, the motor control signals M1F and M1R shown in FIG. 4 are supplied to the motor control circuit MDR1 for controlling the motor MTR1. The motor MTR1 is thus caused to wind up one frame portion of the film. The whole sequence of processes of the camera has come to an end at the step P329.

Figure 8:
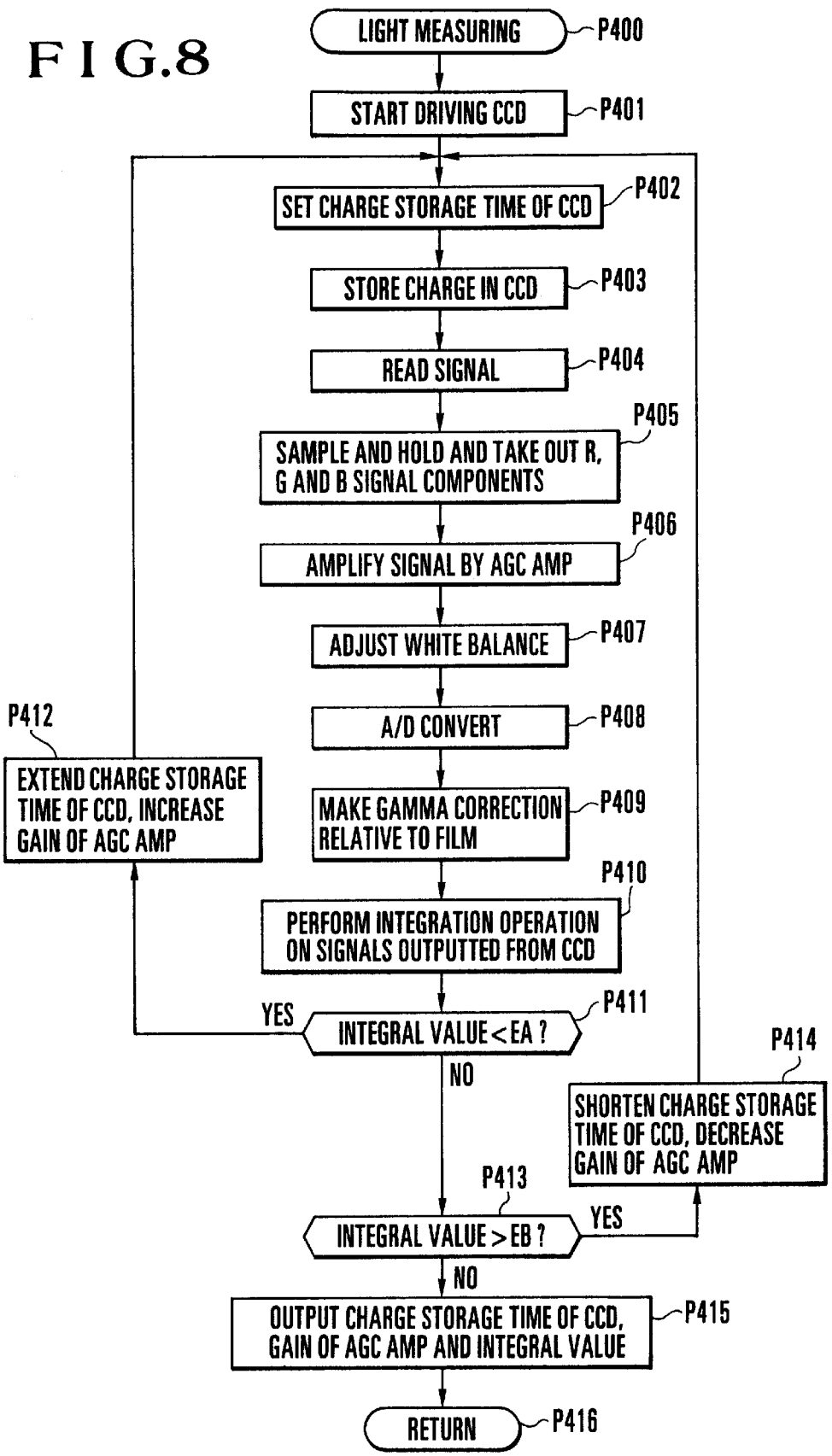
FIG. 8 is a flow chart of a light measuring subroutine of the embodiment of this invention.

FIG. 8 a flow chart showing the light measuring subroutine of the steps P304 and P310. Referring to FIG. 8, when the light measuring subroutine is called, the microcomputer MPRS disposed on the side of the camera communicates with the EVF system controller 223 to request the latter for a light measuring operation. In response to this, the EVF system controller 223 starts executing the light measuring operation. The flow comes to a step P401, the CCD 201 starts to be driven. In other words, the CCD 201 is rendered operative for storing and reading operations jointly by the EVF clock 222 and the CCD driver 202.

At a step P402, an electric charge storage time to be controlled by the CCD driver 202 is set. If the electric charge storing operation of the CCD 201 is to be performed for the first time, the charge storage time is set at a predetermined value. If not, the charge storage time is set at a time value stored. At a step P403, the CCD 201 is caused to perform the charge storing operation for a period of time set by the step P402. Upon completion of the charge storing operation, the flow comes to a step P404. At the step P404, the electric charge stored is transferred in synchronism with the clock signal of the EVF clock 222 and signals are read out from the CCD 201. At a step P405, the signals read out are supplied to the SH circuits 203A to 203C to have the R, G and B signal components taken out. At a next step P406, these R, G and B signals are amplified by the AGC amplifiers 205A to 205C the gains of which are controlled by the electronic volume 224 which is under the control of the EVF system controller 223. At this time, if the signals are read out for the first time, the gain of each amplifier is set at a predetermined gain. If not, the gain is set according to data stored at an applicable address. At a step P407, the gain of each of the WB amplifiers 206A to 206C is controlled, for white balance adjustment, by the electronic volume 224 which is under the control of the EVF system controller 223.

The gain of each of the R, G and B signals is decided on the basis of information on the film currently used for photographing.

At a step P408, the signals processed by the step P407 are converted into digital data. The digital data is inputted to the DSP 208. At a step P409, a gamma correction for the film is made and the flow comes to a step P410. At the step P410, the R, G and B signals which have been converted into digital data are subjected to an integration operation. An integral value thus obtained results from the luminance of the object image. In other words, the integral value is large if the luminance of the object is high and small if the luminance is low.

At a step P411, a check is made to find if the integral value obtained by the step P410 is smaller than a predetermined value EA. If so, the flow comes to a step P412. If not, the flow comes to a step P413. The integral value smaller than the value EA indicates that the digital data obtained by the A/D (analog-to-digital) conversion is at a low level. Then the integral value thus obtained includes a quantization error of the A/D conversion in a large ratio. Then the reliability of the measured data is decided to be low and the flow comes to a step P412 for processing the data once again.

At the step P412, since the level of the signal inputted to the A/D converter is too low, the charge storage time of the CCD is extended and the gain of the AGC amplifier is increased by rewriting the data of the addresses at which these parameters are stored. The flow then again comes to the step P402 to perform data taking-in operations.

If the integral value is found to be not too small at the step P411, the flow comes to a step P413 to find if the integral value is too large. At the step P413, the integral value is compared with a predetermined value EB to find if the integral value is larger than the value EB. If so, the flow comes to a step P414. If not, the flow comes to a step P415. In case where the integral value is larger than the predetermined value EB, the level of the signal coming to the A/D converter is saturated to be higher than the operating range of the A/D converter. Therefore, the luminance of the object tends to be misjudged to be lower than the actual luminance. The step P414 is provided for avoiding this misjudgment. At the step P414, the level of the signal coming to the A/D converter is lowered by shortening the charge storage time of the CCD and lowering the gain of the AGC amplifier by revising the data of the addresses where these parameters are stored. The flow then comes back to the step P402 to perform again the data taking-in operations.

Meanwhile, if the integral value is found at the step P413 to be within a adequate range, the flow comes to a step P415. At the step P415, the charge storage time of the CCD and the gain value of the AGC amplifier at which the adequate integral value has been obtained are stored at applicable addresses. Further, information on the charge storage time of the CCD, the gain value of the AGC amplifier and the integral value is supplied to the microcomputer MPRS disposed on the side of the camera. After the step P415, the flow returns from this subroutine.

Figure 9:
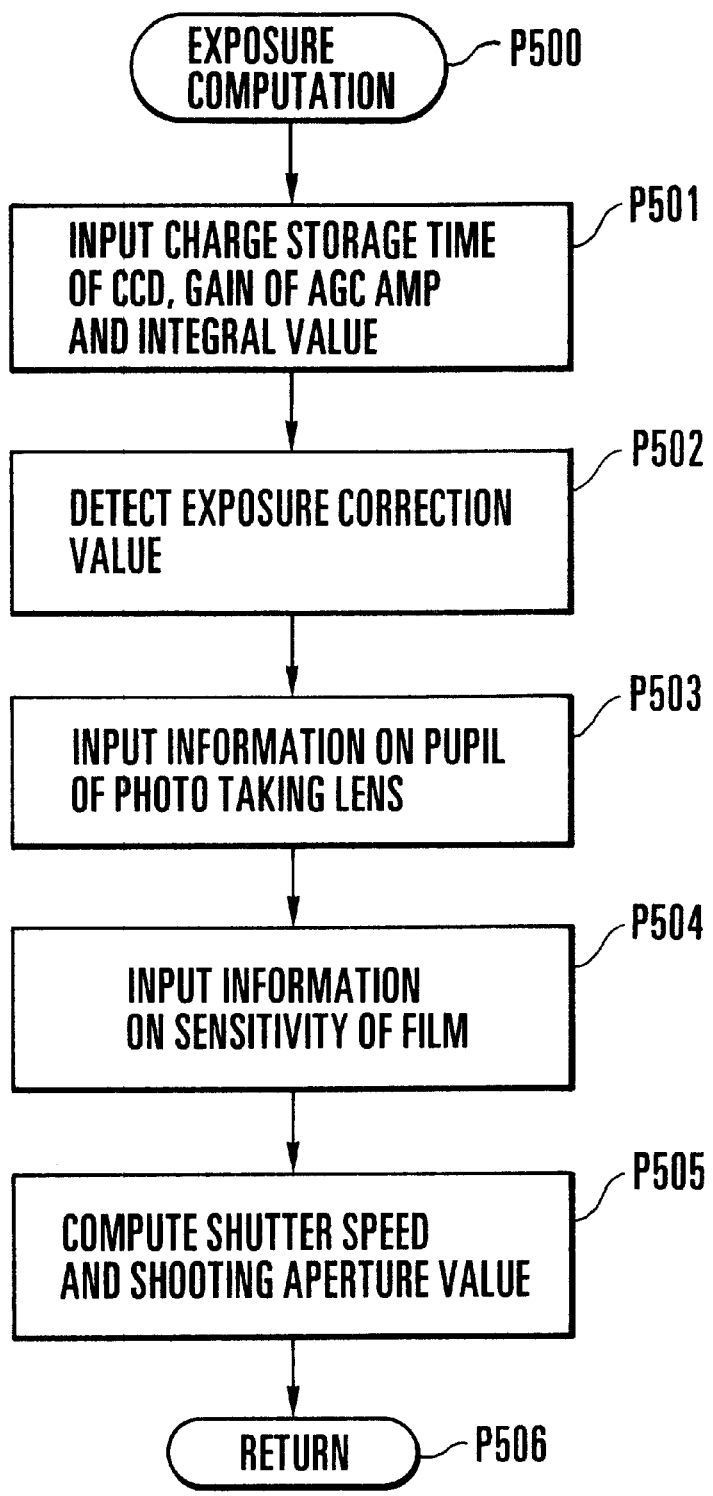
FIG. 9 is a flow chart of an exposure computing subroutine of the embodiment of this invention.
Figure 10:
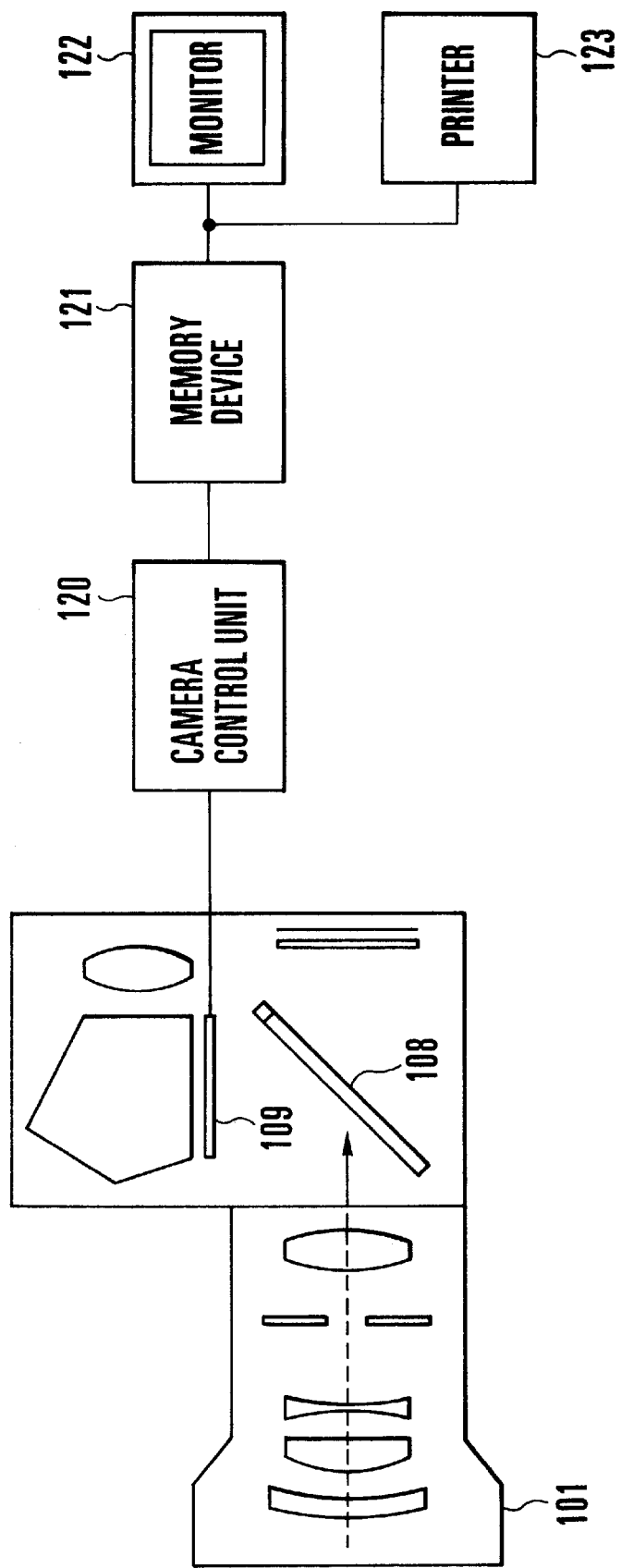
FIG. 10 shows a conventional camera having an electronic viewfinder.

FIG. 9 is a flow chart showing the exposure computing subroutine of the steps P305 and P311 of FIG. 6. Referring to FIG. 9, the exposure computing subroutine is called at a step P500. At a step P501, the microcomputer MPRS on the side of the camera takes in the data for the charge storage time of the CCD, the gain of the AGC amplifier and the integral value obtained by the above-stated light measuring subroutine and also data for intrinsic matters such as the sensitivity of the CCD and the brightness or the F-number of the viewfinder optical system.

At a step P502, an exposure correcting amount is detected through the state of a switch SWA or SWB which is arranged to turn on and off in response to the operation of an operation member provided for exposure correction. At a step P503, pupil information such as a full-open F-number and an effective F-number of the photo taking lens is obtained through communication with the microcomputer LPRS disposed on the side of the lens. At a step P504, the state of a switch member SWS of FIG. 4 is detected to read a signal pattern which is provided on the outer circumferential surface of the film cartridge and consists of conductive and nonconductive parts. Data relative to the sensitivity of the film loaded, the number of frames for which latitude photographing is possible, etc., can be obtained from the signal pattern.

At a step P505, a shutter speed and an aperture value at which the film is to be exposed are computed on the basis of the data obtained by the steps P501 to P504. In this case, the luminance of the object is first computed on the basis of the data obtained by the step P501. Then the shutter speed and the aperture value are computed according to the information on the luminance of the object, film sensitivity and the brightness of the photo taking lens. This subroutine then comes to an end.

Figure 7:
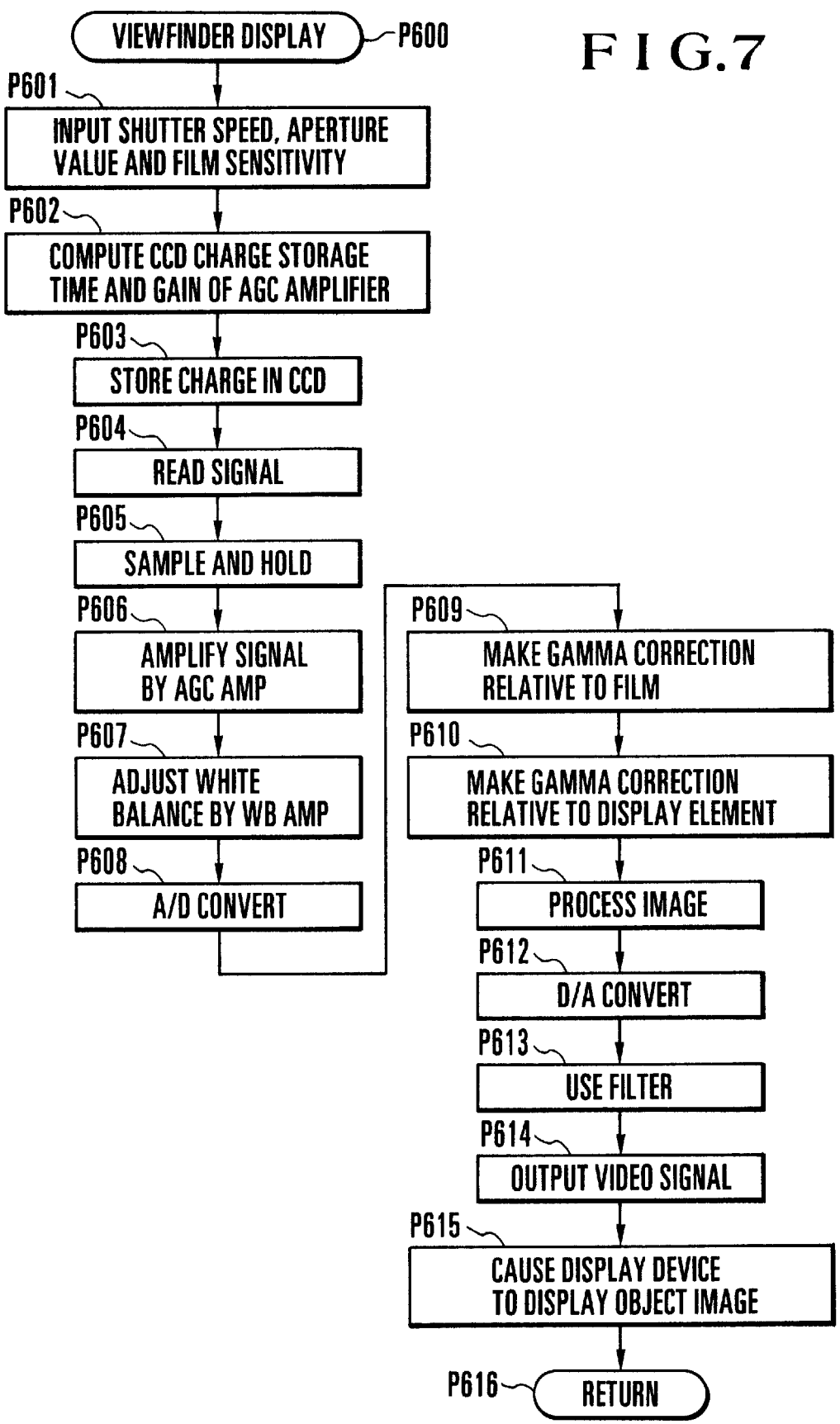
FIG. 7 is a flow chart of a viewfinder display subroutine of the embodiment of this invention.

FIG. 7 is a flow chart showing the viewfinder display subroutine of the steps P306 and P312 of FIG. 6. This subroutine is intended to display at the viewfinder or on a display device a video image which is nearly equivalent to a picture to be taken by making the exposure decided in accordance with the exposure computing subroutine mentioned in the foregoing.

Referring to FIG. 7, a viewfinder display starts at a step P600. The flow goes to a step P601. At the step P601, the data of the shutter speed, the aperture value and the film sensitivity is inputted into the EVF system controller through communication between the microcomputer MPRS of the camera and the EVF system controller. At a step P602, the EVF system controller computes a charge storage time of the CCD and the gain of the AGC amplifier on the basis of the data obtained by the step P601. The charge storage time of the CCD is set at a value as close as possible to an exposure time to be obtained at the shutter speed. This is because such a CCD charge storage time enables the operator to find beforehand the attainability of a desired effect by using a high shutter speed to stop the motion of a moving object or by taking a panning shot of a moving object at a low shutter speed.

With the charge storage time of the CCD arranged to be the same as the shutter time, the correlativity between a picture to be taken and an image display of the viewfinder might be lost with a difference in brightness between the picture and the displayed image becoming uncontainable within a predetermined range within the controllable range of the AGC amplifier gain. In such a case, the storage time of the CCD is controlled and the gain of the AGC amplifier must be controlled either at the upper limit or the lower limit of the control range in such way as to have the CCD charge storage time close to the shutter time.

At a next step P603, the CCD driver is caused to control the CCD in such a way as to have the electric charge stored for the charge storage time obtained by the step P602. Upon completion of the storing operation, the flow comes to a step P604. At the step P604, the electric charge is transferred and signals are read out. At a step P605, the signal read out is sampled and held to take out R, G and B signals. At a step P606, the R, G and B signals are amplified by the AGC amplifiers which are controlled to a gain computed at the step P602. At a step P607, the WB amplifiers are caused to make white balance adjustment. The white balance adjustment is made with respect to the color characteristic of the film, instead of the color temperature of the picture taking light. Therefore, the value of white balance adjustment for a film adapted for daylight and that of white balance adjustment for a film adapted for tungsten light must be set at different values.

At a step P608, the white balance adjusted signals are converted into digital data by the A/D converters. The digital data is inputted to the DSP 208. At a step P609, the DSP 208 makes a gamma correction relative to the photosensitivity characteristic of the film. At a step P610, the DSP 208 makes a gamma correction relative to the luminosity characteristic of the display element. At a step P611, an image processing operation is performed to correct the drop in quantity of peripheral light caused by the interaction of the viewfinder optical system, the main mirror and the photo taking lens or the shading of the CCD. In case where a date imprinting mode is set, characters are combined with the image signal of the object to have a date displayed in a place and in a size approximately corresponding to those of the date to be imprinted on the actual picture.

At a step P612, the digital data is digital-to-analog converted and outputted as an analog video signal. At a step P613, the frequency band of the analog video signal is limited by the filter. At a step P614, the video signal is outputted and supplied to the display device at an apposite output level. At a step P615, the display device is caused to display an object image.

The embodiment described is arranged to process signals in such a way as to display the object image on the display plane of display means in a state which is approximately equivalent to the image of a picture to be obtained on a film with the film exposed to light on the exposure conditions set. Therefore, the image obtained at the viewfinder of the silver-halide type camera having an electronic viewfinder device can be displayed in a state of having a high correlativity with a picture to be taken. The arrangement enables the camera operator to easily confirm beforehand whether a picture of a desired image can be taken, so that a failure in taking pictures can be prevented.

The arrangement to make a gamma correction by taking into consideration the characteristic of the film and that of the display device enables the operator to confirm an effect of exposure correction before actually taking, for example, some shot of a special effect that requires much experience and knowledge. The arrangement to make white balance adjustment by taking the characteristic of the film into consideration enables the embodiment to display the effect of a color filter which hardly can be confirmed by means of an optical viewfinder.

Further, the arrangement to control the image brightness (storage time and AGC amplifier gain) on the basis of an exposure by the camera and the sensitivity of the film enables the embodiment to display an object image at the viewfinder always in a state nearly equivalent to a picture to be obtained by actually taking a shot.

What is claimed is:

1. A camera adapted to a system including a first optical system which has a first optical characteristic and forms a picture image on a film surface and a second optical system which has a different optical characteristic from that of the first optical system and forms an object image on an image sensor, said camera comprising:

a signal processing circuit for carrying out predetermined processes on the image signal outputted from said image sensor, said signal processing circuit performing a process for obtaining the object image for display which is equal to the picture image obtained when the film is exposed and said signal processing circuit performs the process for obtaining the object image by taking into consideration the difference between the optical characteristics of the first and second optical systems;

a display device for displaying the object image by using a processed image signal processed by said signal processing circuit.

2. A camera according to claim 1, wherein the optical characteristic is related to drop of a peripheral light quantity.

3. A camera according to claim 1, wherein the second optical system relays light from the first optical system and leads the light to the image sensor.

4. A camera according to claim 3, wherein the second optical system includes a quick-return mirror.

5. A camera according to claim 3, wherein the second optical system includes a re-imaging lens which re-images an object image formed by the first optical system.

* * * * *

UNITED STATES PATENT AND TRADEMARK OFFICE
CERTIFICATE OF CORRECTION

PATENT NO. : 6,160,581
DATED : December 12, 2000
INVENTOR(S) : Masaki Higashihara et al.

It is certified that error appears in the above-identified patent and that said Letters Patent is hereby corrected as shown below:

<u>Column 3,</u>
Line 25, delete "light an odd-number" and insert -- light at odd-number --.

Signed and Sealed this

First Day of January, 2002

Attest:

*Attesting Officer*

JAMES E. ROGAN
*Director of the United States Patent and Trademark Office*